United States Patent
Johnston et al.

[11] 3,834,142
[45] Sept. 10, 1974

[54] SIDE DELIVERY RAKE

[75] Inventors: Edward J. Johnston, Grange Park; Frank J. Macha, Jr., Lockport, both of Ill.; William H. Knapp; Peter J. Peacock, both of Memphis, Tenn.

[73] Assignee: International Harvester Company, Chicago, Ill.

[22] Filed: June 8, 1973

[21] Appl. No.: 368,144

[52] U.S. Cl..................... 56/377, 56/15.8, 56/15.9
[51] Int. Cl............................................ A01d 77/06
[58] Field of Search ............ 56/377, 376, 370, 15.8, 56/15.9

[56] References Cited
UNITED STATES PATENTS

| | | |
|---|---|---|
| 2,531,934 | 11/1950 | Crose.................................... 56/377 |
| 3,228,179 | 1/1966 | Van Der Lely....................... 56/377 |
| 3,363,407 | 1/1968 | Drummond........................... 56/15.8 |

Primary Examiner—Hugh R. Chamblee
Assistant Examiner—J. N. Eskovitz
Attorney, Agent, or Firm—Dennis K. Sullivan; Floyd B. Harman

[57] ABSTRACT

A side delivery rake is provided with mounting apparatus for attaching it to the front of a tractor. The mounting apparatus comprises connecting linkage and hydraulic lift linkage with an interconnection, preferably a rotary lost motion connection, between the connecting linkage and the hydraulic lift linkage to permit floatation of the rake independent of the lift linkage during operation.

26 Claims, 5 Drawing Figures

3,834,142

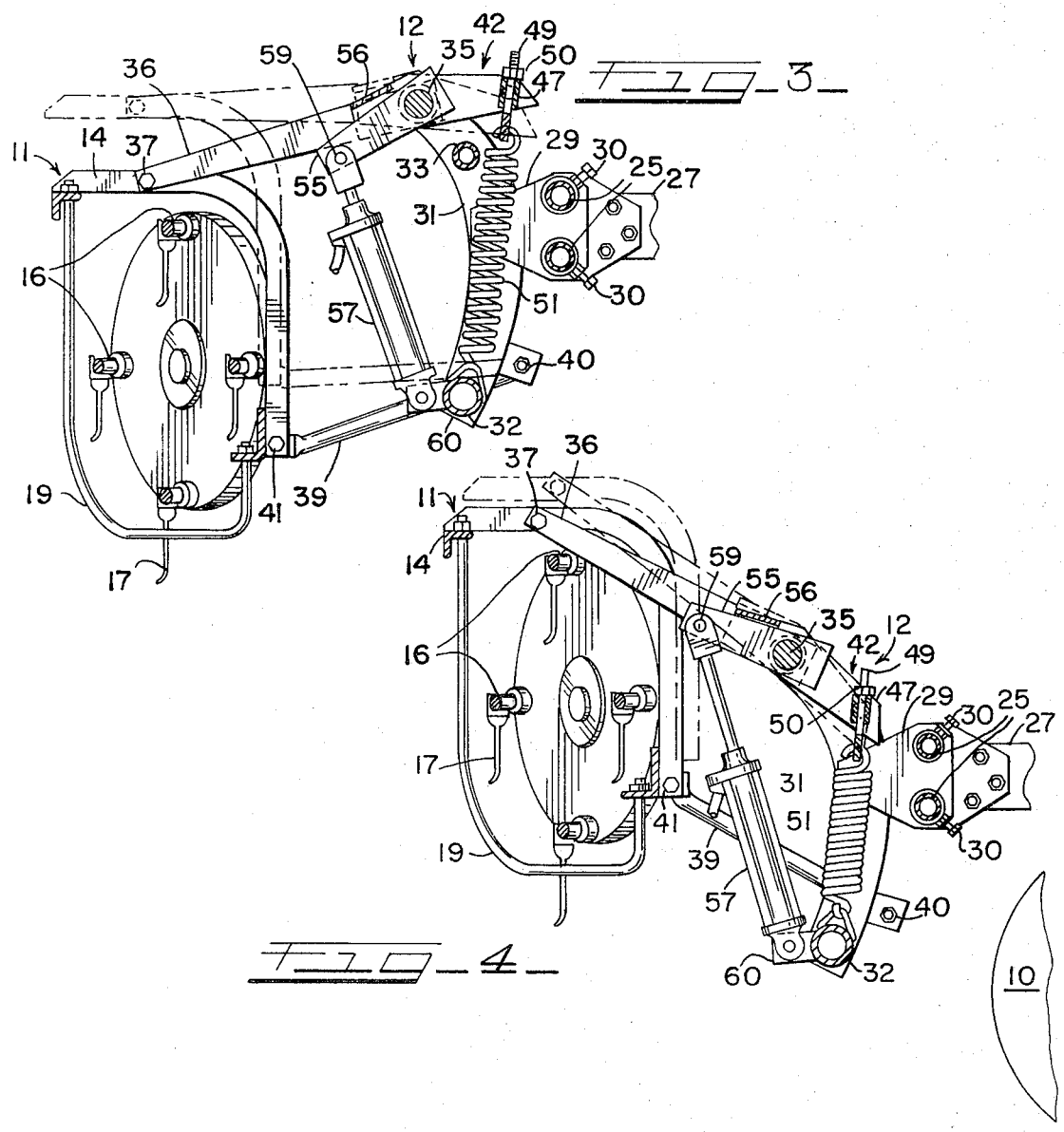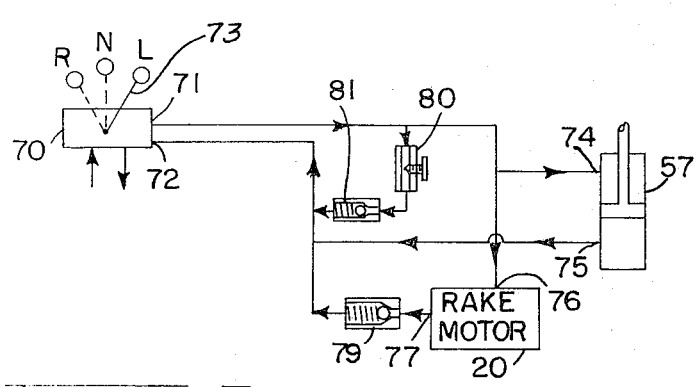

SIDE DELIVERY RAKE

BACKGROUND OF THE INVENTION

The majority of side delivery rakes in use today are designed to be trailed by a tractor. The use of a rake mounted in front of the tractor, however, possesses many advantages. For example, when raking swaths of hay into windrows, a front mounted side delivery rake will engage the crop and place it in a windrow at the side of the tractor before the tractor wheels can run over the crop, as would occur with a rear mounted rake. A front mounted rake can also be used to combine two windrows into a single windrow to be picked up by a baler or forage harvester trailed behind the tractor, thereby permitting the use of higher capacity equipment and reducing the number of passes required to harvest the field.

Such a front mounted rake is described in U.S. Pat. No. 3,546,869, in which the rake is suspended at the front of the tractor from a hydraulically controlled boom and is driven by a hydraulic motor. The minimum height of the rake from the ground is controlled by vertically moving caster wheels engaging a stop on the rake frame. While this rake provides many advantages, most notably a hydraulic lift, which may be used for transport purposes, and a hydraulic drive motor for the rake, it also possesses certain disadvantages. The most important of these is that maintenance of an optimum height (as opposed to minimum height) of the rake above the ground depends on operator control of the hydraulic boom. Another disadvantage is that the hydraulic control of the rake requires the use of two control valves on the tractor, a disadvantage which may become quite important when a trailing machine having its own hydraulic needs is operated simultaneously behind the tractor.

Accordingly, it is a general object of the invention disclosed herein to provide a hydraulically-controlled side delivery rake and apparatus for mounting the rake to the front of a tractor.

It is further an object of the invention to provide a front-mounted side delivery rake having hydraulic lifting means and having the ability to follow the ground contour during operation.

A further object of the invention is to provide apparatus for mounting a side delivery rake to the front of a tractor, having means for lifting the rake interconnected with means permitting the rake to float on the ground during operation.

Another object of the invention is to provide said rake with ground-engaging means for maintaining the rake at a selected height from the ground during operation.

Another object is to provide said rake with spring balancing means to counterbalance a portion of the weight of said rake during operation.

A further object of the invention is to provide said rake with mounting apparatus having the capability of lateral adjustment relative to said tractor, thereby allowing the windrow leaving the rake to be aligned with the pickup on a trailing forage harvester or baler.

Still another object of the invention is to provide a side delivery rake having a hydraulic system for operating the drive and lifting mechanisms thereof using a single control valve.

A more specific object of the invention is to provide a single-valve, parallel, hydraulic control system for a side delivery rake wherein the hydraulic motor driving said rake ceases operation when the rake is raised by the hydraulic lifting means.

Another specific object of the invention is to provide the above-described hydraulic control system with means for regulating the speed of the rake motor.

BRIEF DESCRIPTION OF THE DRAWINGS

Other objects and advantages of the invention will become more apparent upon consideration of the detailed description of the invention and the drawings in which:

FIG. 3 is a side sectional view taken substantially along line 3—3 of FIG. 1 illustrating the mounting apparatus in the operating position and the floatation of the rake in phantom;

FIG. 4 is a side sectional view similar to FIG. 3 but showing the rake in the transport position, the floatation therefrom being illustrated in phantom; and FIG. 5 is a schematic diagram illustrating the hydraulic control system for the side delivery rake of FIG. 1.

In accordance with the art, the terms "left" and "right" used herein are taken as viewed from the operator's station on the tractor facing forward.

DESCRIPTION OF THE PREFERRED EMBODIMENT

Figure 1:
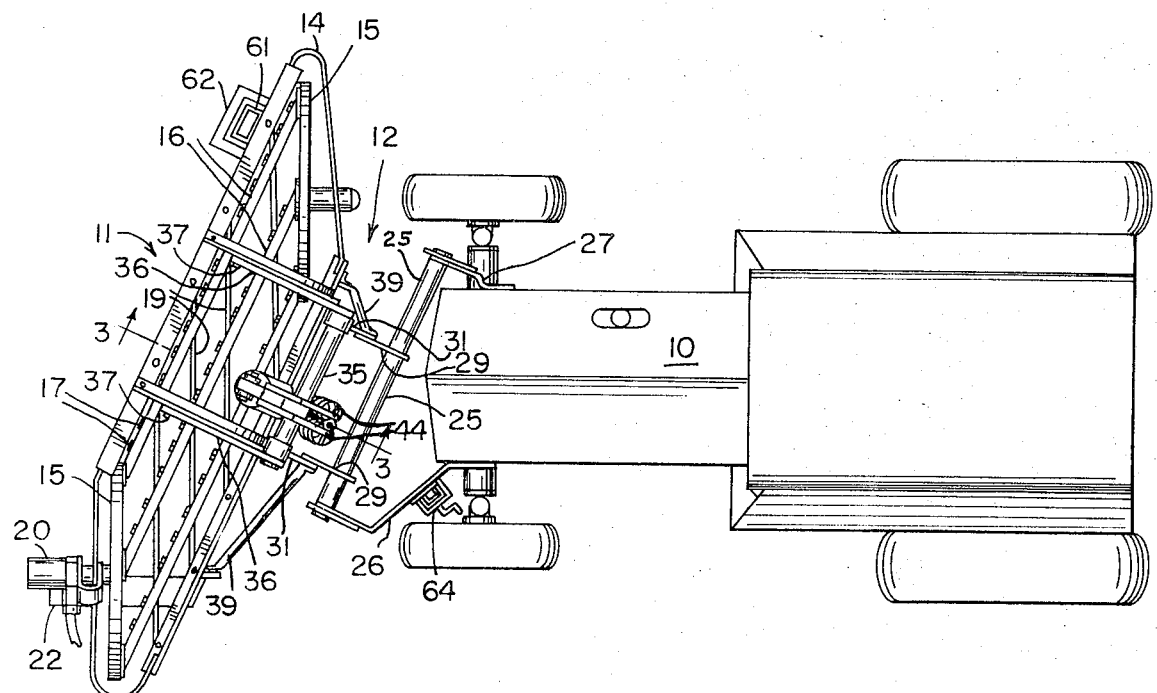
FIG. 1 is a plan view of a side delivery rake mounted on a tractor incorporating the inventive concepts described herein.
Figure 2:
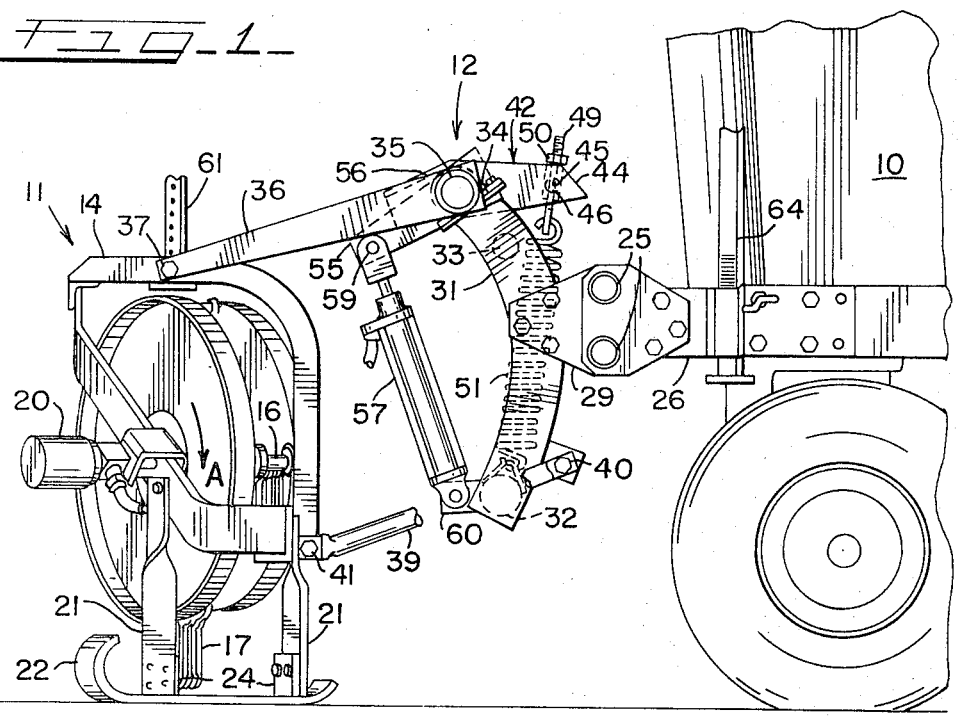
FIG. 2 is a side elevational view of a portion of the rake and tractor of FIG. 1 showing the rake in operating position.

Turning now to FIG. 1, there is shown a tractor generally designated 10 carrying a side delivery rake generally designated 11 which is attached thereto by mounting apparatus generally designated 12. The rake 11 is typical of the well-known parallel bar basket rake and comprises a laterally elongated frame assembly 14 carrying a pair of parallel disks 15 rotatably mounted at either end thereof which are connected by a number of rotatably mounted parallel rake bars 16 circumferentially spaced thereon carrying laterally spaced rake tines 17. A series of stripper bars 19 are attached to the frame 14 in parallel relation with the disks 15 and generally enclose the lower and forward portions of the periphery defined by the rake bars 16. The disks 15 are driven by a hydraulic motor 20 which receives fluid power from the tractor 10 in a manner to be described in detail below. As shown in FIG. 1, the rake bars 16 are oriented diagonally of the direction of travel of the tractor 10 and the disks 15 are perpendicular thereto so that upon rotation of the disks in the direction A (FIG. 2), the hay is moved laterally by the rake tines 17 as the tractor moves forward.

A pair of spaced vertical brackets 21 aligned in the direction of travel are attached to the left side of the frame 14 and extend downward whereat they receive the fore and aft portions respectively of a skid shoe 22, the skid shoe 22 having a pair of complementary brackets 24 welded thereto for attachment of the shoe 22 to the brackets 21. Selective vertical adjustment of the shoe 22 relative to the frame 14 is provided by multiple bolt holes in one set of the brackets 21 or 24. As shown in FIG. 1, the skid shoe 22 preferably extends along the line of travel across the entire diagonal projection of the rake basket to prevent the rake tines 17 from becoming damaged as could occur by a single point gage means encountering localized ground variations.

Turning now to the apparatus for mounting the rake on the tractor, a pair of vertically spaced fixed horizontal mounting bars 25 are mounted diagonally of the line of travel by left and right bracket assemblies 26 and 27 to the front of the tractor 10 preferably by bolting as shown. Slidably mounted on the mounting bars 25 are left and right mounting frame brackets 29 which are provided with set screws 30 (FIG. 3) to adjustably locate them thereon. A pair of left and right vertical side members 31 are respectively attached intermediate their ends to the mounting frame brackets 29 and are connected near the bottom portion thereof as by welding by a fixed horizontal member 32, an upper horizontal member 33 also connecting the side members 31 to produce a rigid frame structure. Thus a transversely adjustable rigid mounting frame is provided for mounting the rake to the tractor.

The top portion of the vertical side members 31 are provided with journals 34 which receive a horizontal rockshaft 35 extending therethrough. At each end of the rockshaft 35, a pair of left and right upper lift links 36 are respectively affixed thereto and extend toward the rake 11 whereat they are respectively pivotally mounted at the top of the frame 14 by a pair of horizontal coaxial pins 37. A pair of lower links 39 are pivotally mounted near the bottom of the side members 31 by horizontal coaxial pins 40 and extend to the lower rear portion of the frame 14 and are pivotally mounted thereat by horizontal coaxial pins 41. To improve the lateral stability of the linkage, the pivotal connections of the lower links 39 to the rake frame 14, as shown in FIG. 1, are preferably laterally offset from the pivotal connection of the lower links to their respective side members 31. Thus, the rake is pivotally mounted for vertical movement with respect to the mounting frame by a four bar parallel linkage which provides the additional advantage of maintaining a constant attitude of the rake tines 17 relative to the ground. Should it be desirable to adjust the attitude of the rake tines, either pair of links or their mountings could be made adjustable (not shown).

In order to increase the responsiveness of the rake to the ground contour, spring balancing means are provided in the form of a balance lever 42 affixed to the rockshaft 35 intermediate its ends and extending forwardly and rearwardly therefrom. The balance lever assembly 42 comprises a pair of parallel plates 44 having coaxial holes 45 in their respective rear portions to pivotally receive pins 46 diametrically disposed on a collar 47 between the plates 44. A spring tensioning member 49 in the form of an inverted T extends through the collar 47 and threadedly receives an adjusting nut 50 thereabove. The lower portion of the tensioning member 49 extends laterally in both directions to receive at each end one of a pair of balancing springs 51. The balancing springs 51 extend downwardly and are connected through suitable means to the fixed horizontal mounting frame member 32. The springs 51 preferably counterbalance about 70 per cent of the weight of the rake when the skid shoe 22 is on the ground. This may vary somewhat depending on the ground contour and responsiveness required and consequently, the adjusting nut 50 is provided for adjustment of the spring tension.

Lifting linkage which may be used to raise the rake for transport, to clear obstructions, or for clearing blockages of the tines, comprises a free pivoting lift lever 55 mounted for rotation about the rockshaft 35 and located thereon between the plates 44 of the balance lever 42. The portion of the balance lever 42 forward of the rockshaft 35 is provided with a stop plate 56 connecting the plates 44 across the top thereof thereby forming an inverted U section. Thus, when the lift lever 55 is rotated clockwise or upwardly, it contacts the stop plate 56 and thereafter, further rotation of the lift lever 55 causes the rockshaft 35 to rotate the upper lift links 35 thereby raising the rake 11. Thus, as shown in FIGS. 3 and 4, the mounting of the lift lever 55 with respect to the balance lever 42 creates an interconnection of the float linkage and the link linkage which permits the rake to be hydraulically raised while having a floatation mounting on the operating position. It is noted that even when the rake is in the raised position, as shown in FIG. 4, it may still float further upwardly should the rake contact the ground or an obstruction as might occur when the tractor crosses a deep furrow or a gully.

To provide the lifting power required, a hydraulic cylinder 57 is pivotally connected by a pin 59 at the free end of the lift lever 55, the other end of the cylinder being pivotally connected to a bracket 60 attached to the horizontal mounting frame member 32. It has been found preferable to use a double-acting hydraulic cylinder so that the lift lever 55 may be retracted away from the stop plate 56 to provide the rake with the capability of floating downward in the operating position without having to move the hydraulic cylinder, thereby ensuring the ability of the rake to follow the ground contour.

To facilitate the detachment and storage of the rake, a parking stand 61 is slidably mounted on the right front portion of the frame 14 in a bracket 62 attached thereto. The shaft of the stand is provided with appropriate means, such as a series of holes receiving a pin, to allow it to remain in an out of the way position during operation while allowing it to be lowered to provide support for the right side when the rake is detached from the tractor. A screw jack 64 of the type well known in the art is attached to the left mounting bracket 26 to provide a second support point, the gage shoe 22 being the third support. The jack 64 is additionally helpful in aligning the bolt holes in the brackets 26 and 27 with those on the tractor 10 during attachment of the rake to the tractor.

Directing attention now to FIG. 5, there is shown schematically a hydraulic system for operating and controlling the rake using a single control valve. The hydraulic system comprises a control valve 70 suitably supplied with hydraulic fluid from a hydraulic pump (not shown) on the tractor 10. The control valve 70 is preferably mounted at the operator's station on the tractor for selective remote operation of the rake and supplies fluid pressure to one of two outlets 71 and 72, the pressure being supplied to outlet 71 when the control valve lever 73 is in the L or rake lowered position and to the outlet 72 when the control valve lever is in the R or raised position. The outlet not supplied with pressure functions to return the fluid back to the hydraulic fluid reservoir in the tractor. The valve 70 may also have a N or neutral position which may be used advantageously to hydraulically lock the system, for example, to maintain the rake in a raised position when the tractor engine is shut off.

The double-acting hydraulic cylinder 57 has a retraction inlet 74 connected by fluid conduit to the valve outlet 71 and an extension inlet 75 connected by fluid conduit to the control valve outlet 72. The hydraulic rake motor 20 is connected to the control valve 70 in parallel with the hydraulic cylinder 57; that is, the hydraulic motor inlet 76 is connected by fluid conduit with the control valve outlet 71 and the hydraulic motor outlet 77 is connected by fluid conduit with the control valve outlet 72.

Associated with the outlet 77 of the hydraulic motor 20 are restrictive means in the form of a one-way valve 79 which is arranged to prevent flow from entering the hydraulic motor 20 through the outlet 77. The one-way valve may be a part of the motor assembly; however, if the valve is separate, as shown in FIG. 5, care must be taken to insure thant the valve does not prevent flow into the extension inlet 75 of the hydraulic cylinder 57.

Thus, when the control valve lever is placed on the L or rake lowered position, hydraulic fluid flows in the direction indicated by the arrows in FIG. 5 and is directed to retract the hydraulic cylinder 57, lowering the rake, and to operate the rake motor 20. When the control valve lever is placed in the R or rake raised position, the fluid flows in reverse to extend the cylinder 57 and raise the rake and, since the one-way valve 79 prevents flow to the hydraulic motor 20, the rake stops.

An adjustable flow control valve 80 in series with a second one-way valve 81 may be optionally added to the hydraulic system in parallel with the hydraulic cylinder 57 and with the rake motor 20 to provide speed regulation for the rake motor. The one-way valve 81 is arranged to prevent flow from the control valve outlet 72 to the outlet 71 when the rake is raised so that the hydraulic cylinder will not bleed down due to the weight of the rake assembly, especially when the hydraulic pump output is reduced by the tractor being allowed to idle.

Thus it is apparent that there has been provided, in accordance with the invention, a side delivery rake that fully satisfies the objects, aims, and advantages set forth above. While the invention has been described in conjunction with a specific embodiment thereof, it is evident that many alternatives, modifications, and variations will be apparent to those skilled in the art in the light of the foregoing description. Accordingly, it is intended to embrace all such alternatives, modifications, and variations as fall within the spirit and broad scope of the appended claims.

What is claimed is:

1. A hydraulically-controlled side delivery rake adapted to be mounted to the front of a tractor comprising:
   a frame assembly having ground engaging means to limit the downward travel thereof;
   raking means carried by said frame assembly;
   mounting frame means adapted for attachment to said tractor;
   linkage means pivotally connecting said frame assembly to said mounting frame means for vertical movement relative thereto;
   hydraulic lifting means operatively associated with said linkage means for raising said frame assembly relative to said mounting frame means; and
   means interconnecting said lifting means and said linkage means, said interconnecting means being operative to permit separation of said linkage means from said lifting means in response to forces transmitted from said ground-engaging means to said linkage means by said frame assembly.

2. The invention in accordance with claim 1 wherein said linkage means comprises upper link means pivotally connected to said frame assembly and extending to a pivotal mounting to said mounting frame means about a substantially horizontal axis.

3. The invention in accordance with claim 2 wherein said upper link means comprises a pair of links extending from laterally spaced pivotal connections to said frame assembly to fixed connections at opposite ends of a transverse shaft rotatably carried by said mounting frame means.

4. The invention in accordance with claim 3 and a pair of lower links extending from pivotal connections at opposite ends of said frame assembly to pivotal connections to said mounting frame means.

5. The invention in accordance with claim 3 wherein said linkage means further comprises a balance lever mounted to said transverse shaft intermediate the ends thereof, said lifting means being adapted to engage a portion of said balance lever to lift said frame assembly.

6. The invention in accordance with claim 5 wherein balancing springs means connect said balance lever to said mounting frame means to balance a portion of the weight of said rake.

7. The invention in accordance with claim 1 wherein said mounting frame means comprises a supporting frame mounted on said tractor, said supporting frame comprising a pair of substantially vertical members, a transverse rockshaft being pivotally mounted in each of said members.

8. The invention in accordance with claim 7 wherein a portion of said linkage means is affixed to said rockshaft to rotate therewith.

9. The invention in accordance with claim 7 wherein said supporting frame is transversely adjustable with respect to said tractor.

10. A hydraulically controlled side delivery rake adapted to be mounted to the front of a tractor comprising:
    a frame assembly;
    raking means carried by said frame assembly;
    mounting frame means adapted for attachment to said tractor;
    linkage means pivotally connecting said frame assembly to said mounting frame means for vertical movement relative thereto;
    hydraulic lifting means operatively associated with said linkage means for raising said frame assembly relative to said frame means;
    means interconnecting said lifting means and said linkage means, said interconnecting means being operative to permit vertical movement of said linkage means relative to said lifting means in response to forces transmitted to said linkage means by said frame assembly; and
    spring balancing means connecting said linkage means to said mounting frame means and operatively disposed to counterbalance a portion of the weight of said rake.

11. The invention in accordance with claim 10 and said frame assembly having ground-engaging means to limit the downward travel thereof.

12. A hydraulically controlled side delivery rake adapted to be mounted to the front of a tractor comprising:
a frame assembly;
raking means carried by said frame assembly;
mounting frame means adapted for attachment to said tractor;
linkage means pivotally connected to said frame assembly and extending to a pivotal mounting to said mounting frame means about a substantially horizontal axis to permit relative vertical movement therebetween;
hydraulic lifting means operatively associated with said linkage means for raising said frame assembly relative to said mounting frame means, said lifting means comprising a lift arm pivotally mounted for free rotation about said horizontal axis, said linkage means being provided with means for arresting said rotation of said lift arm relative to said linkage means to effect lifting of said linkage means, said arresting means being operative to permit vertical movement of said linkage means relative to said lifting means in response to forces transmitted to said linkage means by said frame assembly.

13. The invention in accordance with claim 12 wherein said lifting means further comprises a hydraulic cylinder connecting said lift arm and said mounting frame means, said cylinder being adapted for remote actuation.

14. The invention in accordance with claim 13 wherein balancing spring means connects said linkage means to said mounting frame means, said balancing spring means operatively disposed to balance a portion of the weight of said rake.

15. The invention in accordance with claim 13 and a hydraulic drive motor driving said raking means, conduit means establishing a parallel fluid connection of said motor and said hydraulic lift cylinder with a single control valve adapted for connection to a source of fluid power for effecting driving and vertical movement of said rake.

16. The invention in accordance with claim 15 and restrictive means associated with said drive motor to prevent the operation thereof when said lift cylinder is operated to raise said rake.

17. A hydraulically controlled side delivery rake adapted to be mounted to the front of the tractor comprising a frame assembly, raking means carried by said frame assembly, mounting frame means comprising a supporting frame mounted on said tractor, said supporting frame having a pair of substantially vertical members, a transverse rockshaft pivotally mounted in each of said members, linkage means pivotally connecting said frame assembly to said mounting frame means for vertical movement relative thereto, a portion of said linkage means being affixed to said rockshaft to rotate therewith, hydraulic lifting means operatively associated with said linkage means for raising said frame assembly relative to said mounting frame means, said lifting means comprising an arm pivotally mounted for rotation about said rockshaft, means being provided to arrest said rotation to effect lifting of said rake, said arresting means being operative to permit vertical movement of said linkage means relative to said lifting means in response to forces transmitted to said linkage means by said frame assembly.

18. The invention in accordance with claim 17 wherein said supporting frame has a fixed transverse member and said lifting means further comprises a hydraulic cylinder connecting said transverse member to said arm, said cylinder being remotely actuable.

19. The invention in accordance with claim 18 wherein a balancing spring means connects said linkage means to said transverse member, said spring means being operatively disposed to counterbalance a majority of the weight of said rake.

20. Apparatus for mounting a side delivery rake, said rake having a frame, to the front end of a tractor comprising:
a mounting frame assembly mounted to the front of said tractor, said frame assembly having a transverse shaft;
ground-engaging means attached to and depending downwardly from said rake frame to limit the downward travel thereof;
linkage means pivotally connecting said rake frame to said mounting frame assembly for vertical movement of said rake frame relative to said mounting frame assembly, a portion of said linkage means being adapted to rotate about the axis of said transverse shaft;
lifting means connected to said mounting frame assembly and adapted to engage a portion of said linkage means to effect lifting of said rake, said lifting means being disengageable from said linkage means to permit said linkage means to move independently thereof.

21. The invention in accordance with claim 20 wherein said mounting frame assembly is selectively transversely adjustable relative to said tractor.

22. The invention in accordance with claim 20 wherein said ground-engaging means provides ground contact parallel to the line of travel and over a distance substantially equal to the diagonal projection of said rake in the direction of travel.

23. Apparatus for mounting a side delivery rake, said rake having a frame, to the front end of a tractor comprising:
a mounting frame assembly mounted to the front of said tractor said frame assembly having a transverse shaft rotatably carried thereby;
linkage means pivotally connecting said rake frame to said mounting frame assembly for vertical movement of said rake frame relative to said mounting frame assembly, a portion of said linkage means being fixed to said shaft for rotation therewith;
lifting means connected to said mounting frame assembly and adapted to engage a portion of said linkage means, said lifting means comprising an arm rotatable relative to said shaft, said portion of said linkage means having means engageable by said arm to cause said shaft and said linkage means to rotate to lift said rake, said lifting means being disengageable from said linkage means to permit said linkage means to move independently thereof.

24. The invention in accordance with claim 23 wherein actuating means are provided to rotate said arm relative to said shaft to lift said rake.

25. The invention in accordance with claim 24 wherein said actuating means comprises a hydraulic cylinder pivotally connected at one end to said arm and at the other end said mounting frame assembly.

26. The invention in accordance with claim 25 wherein said linkage means comprises a four bar parallel linkage, the upper links thereof being fixed at opposite ends of said transverse shaft.

* * * * *